United States Patent [19]

Wilkens

[11] 4,309,771

[45] Jan. 5, 1982

[54] DIGITAL RADIO TRANSMISSION SYSTEM

[75] Inventor: Mark W. Wilkens, Palo Alto, Calif.

[73] Assignee: Farinon Corporation, San Mateo, Calif.

[21] Appl. No.: 53,961

[22] Filed: Jul. 2, 1979

[51] Int. Cl.³ ........................................... H03K 13/34
[52] U.S. Cl. ......................................... 375/58; 371/5; 455/69
[58] Field of Search ................ 343/7 R, 7 A, 7 AG; 370/7, 24, 79, 84; 371/5, 30, 41, 72, 22, 23; 375/26, 34, 37, 58; 455/63, 68, 69, 72

[56] References Cited

U.S. PATENT DOCUMENTS

| | | | |
|---|---|---|---|
| 1,658,856 | 2/1928 | Potter | 455/69 X |
| 2,912,569 | 11/1959 | Shepherd | 455/69 X |
| 3,028,489 | 4/1962 | Chasek | 455/17 X |
| 3,151,295 | 9/1964 | Haviland | 455/9 |
| 3,415,952 | 12/1968 | Blackburn et al. | 455/17 |
| 3,534,264 | 10/1970 | Blasbalg et al. | 375/34 X |
| 3,732,496 | 5/1973 | Boyer | 455/69 |
| 3,745,464 | 7/1973 | Lee | 455/69 |
| 3,795,910 | 3/1974 | Robinson, Jr. | 343/7.5 |
| 3,925,782 | 12/1975 | Anderl et al. | 455/69 |
| 4,004,224 | 1/1977 | Arens et al. | 455/70 |
| 4,091,239 | 5/1978 | Lainey et al. | 370/17 |
| 4,091,240 | 5/1978 | Lainey et al. | 370/17 |

Primary Examiner—Benedict V. Safourek
Attorney, Agent, or Firm—Flehr, Hohbach, Test

[57] ABSTRACT

A digital radio transmission system for compensating for co-channel or adjacent channel interference or signal level variations and distortions is provided. The system includes apparatus for transmitting a digital signal having a first signal level from a first location to a second remote location, apparatus for monitoring at the second remote location the bit error rate of the received digital signal and apparatus for changing the level of the transmitted digital signal when the received bit error rate is different from a predetermined value.

8 Claims, 4 Drawing Figures

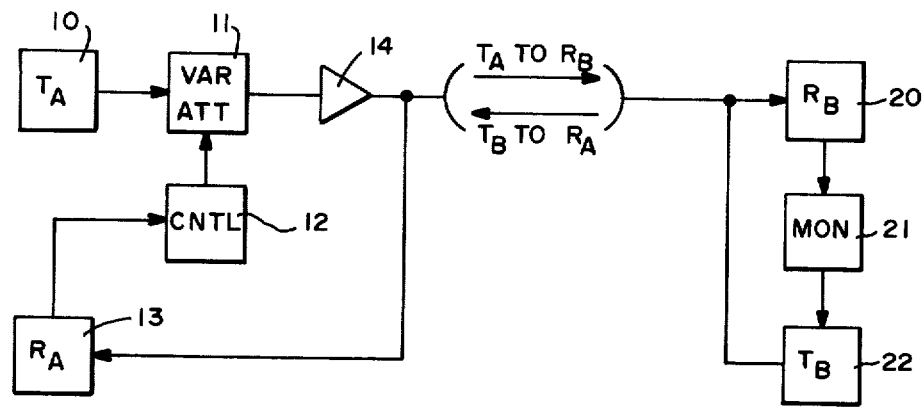
FIG.—1
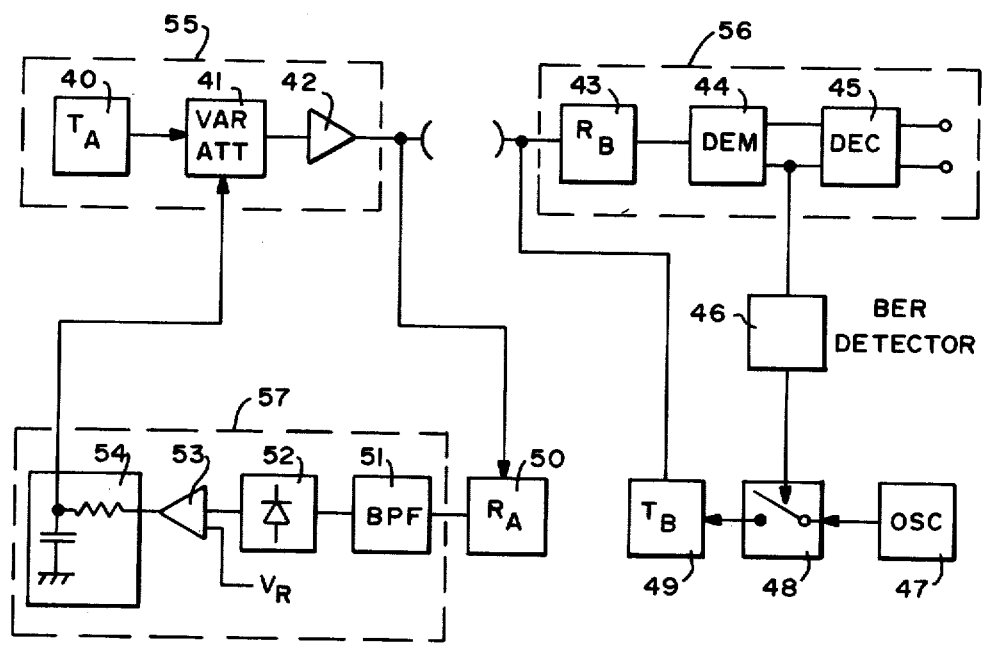
FIG.—2

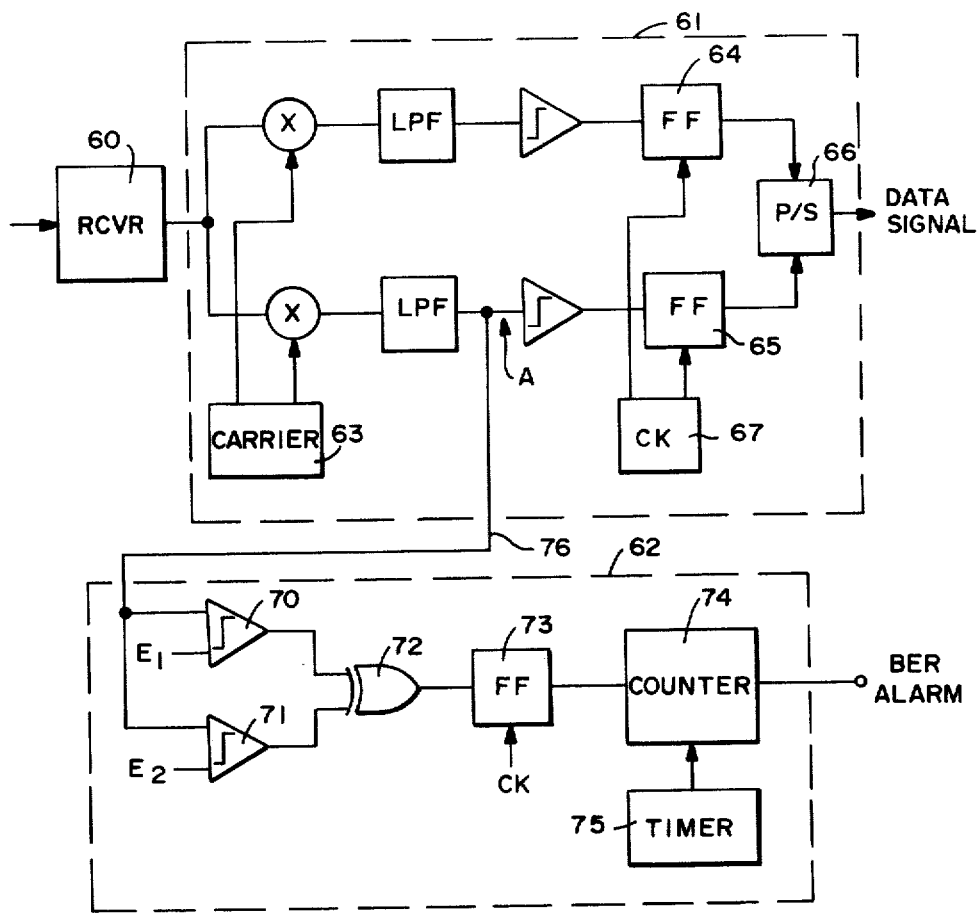
FIG.—3
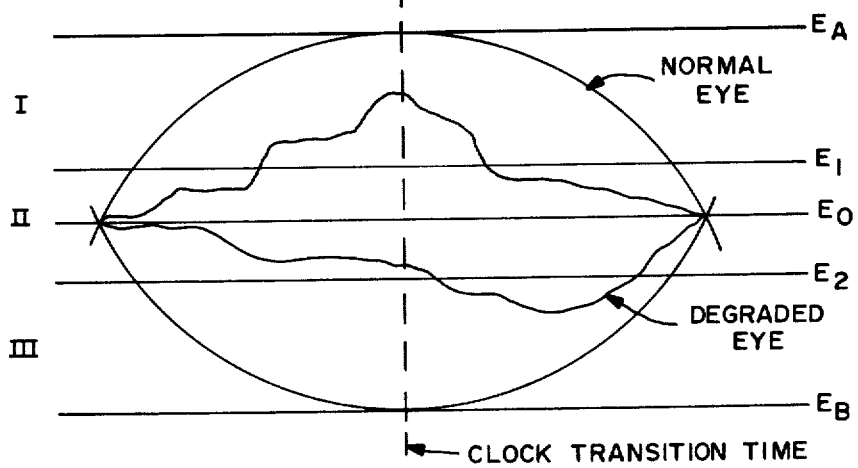
FIG.—4

DIGITAL RADIO TRANSMISSION SYSTEM

The present invention relates to a digital radio transmission system and method. More particularly, it is intended to deal with certain problems which result from the fading of radio signals transmitted through the atmosphere.

Microwave radio transmission systems are normally designed with enough excess transmitter output power to accommodate occasional increases in path loss caused by multi-path fading. The excess power, or fade margin, is typically about 40 db, and the accumulated duration of fades of this depth at microwave frequencies is on the order of several minutes per year. A transmitter operates continuously at this high output level despite the infrequent need for it, and thereby causes certain interference problems. In FM/FDM systems, there is an additional use for the margin, namely reduction of the average noise level. For systems carrying pulse code modulated (PCM) information, this margin is unnecessary, and consequently transmitter power can be reduced to just above the receive threshold level when it is not needed to overcome fade attenuation. The normal transmitting and receiving levels are therefore reduced by 30 to 40 db below the maximum levels, thus reducing interference potential and facilitating more frequent reuse of the channel. At the same time, however, the transmission becomes more vulnerable to interference from other sources.

In one prior art approach, U.S. Pat. No. 4,004,224 to Arens et al, there is described a method in which upon the appearance of fading on a particular path in a radio transmission system, the transmitted power is automatically increased on that path to maintain a constant received power at the receiver, with the increase being effected at a remote transmitter over a return or auxiliary channel from the receiver concerned by fading to the associated remote transmitter. However, Arens' system does not measure transmission performance itself, but only the received signal level, and consequently is unable to deal effectively with signal degradations caused by interference from other systems (such as co-channel or adjacent channel interference). Arens recognizes the difficulties caused by interference; as a remedy the received level is set 10 to 20 db above the interference level. This solution is inadequate with efficient forms of modulation.

In view of the above background, it is an objective of the present invention to provide an improved digital transmission system and method that can monitor and respond to transmission performance of digital radio systems directly, thereby making it possible to compensate for adjacent and co-channel interference, and for certain transmission distortion effects, in addition to degradation due to fading (signal level variation), and therefore to operate at much lower average signal levels.

By way of summary, the present invention relates to a digital radio transmission system and method. The transmitted signal includes a radio frequency carrier modulated by digital information signals; it is referred to in the following description as a "digital signal."

The invention includes means for transmitting digital signals from a first location to a second remote location, means for monitoring the bit error rate of the received digital signal, and means for changing the level of the transmitted digital signal when the received bit error rate is different from a predetermined value.

In accordance with the above summary, the present invention achieves the objective of providing an improved digital transmission performance by directly compensating for cochannel and adjacent channel interference, and signal level variations.

Other objectives and features of the invention will become apparent from the following description when taken in conjunction with the accompanying drawings, in which:

FIG. 1 depicts a general block diagram of a radio transmission system according to the present invention with such a control system provided for one direction of transmission.

FIG. 2 depicts a more specific block diagram of the same system of FIG. 1.

FIG. 3 depicts a digital radio receiver according to the present invention, including an implementation of a bit error rate estimating circuit.

FIG. 4 depicts typical eye patterns at circuit point A of the system of FIG. 3.

FIG. 1 depicts a block diagram of a digital radio transmission system according to the invention. Information is transmitted from transmitter 10 to receiver 20, where the quality of the received signal is evaluated by monitor 21. A signal controlled by the quality estimate is sent by means of transmitter 22 to receiver 13, where it is used by control circuit 12 to adjust the attenuator 11, and thus the power at the output of amplifier 14, as required to maintain the required quality. The system thus constitutes a feedback control loop which adjusts the transmitted power to maintain some preset transmission quality at receiver 20. The level required at the receiver will vary with transmission conditions and interference levels. For instance, the normal received signal level (RSL) may typically be a few db above the desired threshold level. When the path between transmitter 10 and receiver 20 fades, the transmitter output is increased for the duration of the fade by just enough to maintain the required BER performance; the RSL thus typically remains constant. However, when nearby interfering paths fade, the trasmitted levels will similarly be increased on the affected paths, thus causing an increase in the interference level on the 10-20 path, and thereby degrading transmission. Under these conditions the output of transmitter 10 is also increased as required to achieve the required BER performance, but in this case the RSL will be increased above the average level. All elements of such a system, with the exception of attenuator 11, control circuit 12 and monitor 21, are found in present-day microwave transmission systems.

It is known to use such a control loop to control the received signal (RSL) at receiver 20, for instance by monitoring AGC voltage. This approach is adequate in an interference-free environment, but fails when interference is present, because the interference may typically have essentially no effect on the total signal level under conditions of interest, but it may limit the performance of the transmission system by creating intolerable distortion. It is the objective of the present invention to provide a system functioning within accepted standards in an environment containing high levels of interference by a suitable choice of monitor and control system.

A more specific form of such a control system is shown in FIG. 2, in which a digital radio transmitter 40 generates a digital signal, which is controlled in level by the variable attenuator 41 and amplified by RF amplifier 42. The signal is received in typical manner by receiver 43 and demodulated by demodulator 44. Error rate detector 46 derives an estimate of the bit error rate (BER) from the demodulated eye pattern. When the BER falls below a predetermined threshold, switch 48 is closed, which causes a tone from oscillator 47 to be sent via the service channel of transmitter 49 and receiver 50 to the control circuit 57. The received tone is filtered by filter 51, detected by detector 52, and compared with a reference voltage (VR) by comparator 53. When the detected voltage exceeds VR, the output of comparator 53 changes to a state which, after filtering by integrator 54, tends to increase the attenuation of attenuator 41, thus reducing the transmitted signal. The net result is to control the signal at receiver 43, causing it to dither within controllable limits about the lowest level which results in the BER preset at detector 46. This level may vary with time because of variable interference, path distortion and attenuation.

The transmitter and receiver units could be Farinon DM1-2 A units. The remaining circuits, with the exception of 46, are non-critical, and are known to those skilled in the art.

It is emphasized that this particular implementation of the control circuit is only an example chosen for illustration of the principle. Such a control circuit could be provided for each transmission direction to provide protection for a digital radio transmission system having a plurality of transmission paths. Many other realizations are possible. The unique and essential property is the control of the signal to a level near the minimum needed to yield the required transmission performance.

Referring now to FIG. 3, a preferred embodiment of the bit error rate monitor of FIG. 2 is illustrated and is described in conjunction with FIG. 4, which depicts an eye pattern of the demodulator output. FIG. 3 depicts a normal radio receiver down converter and IF amplifier 60, demodulator and decoder circuit 61 and further includes bit error rate monitor 62.

The transmitted RF signal into circuit 60 is down-converted, filtered, amplified and connected to demodulator circuit 61, which could be, for example, a typical quadrature demodulator circuit for generating I and Q quadrature baseband signals by demodulating the transmitted signal with demodulating carriers from circuit 63. The I and Q signal streams are sliced or amplified nonlinearly about a threshold voltage, the data are extracted by flip-flops 64, 65, which store under control of clock circuit 67 the signal polarity at timing transition points; the streams are then merged into a single data stream by parallel to serial converter 66.

In FIG. 4, error rate information can be estimated from the eye pattern by looking for the presence of eye transitions near the decision threshold. Many traces in this region, such as occur with a degraded eye pattern, indicate that errors are probably being made in the data decisions. This information can be used to derive an estimate of the true error rate which is sufficiently accurate for the present purposes.

Referring now to FIGS. 3 and 4, the operation of circuit 62 is now described. The I or Q signal (say the Q signal) is applied from point A via bus 76 to slicers 70, 71 together with reference voltages E1 and E2, as seen in FIG. 4. The slicer outputs 70, 71 are high if the Q signal is greater than threshold levels E1, E2, and the outputs are low if the Q signal is below the threshold values. When the Q voltage is in regions I or III of the eye pattern of FIG. 4, the outputs are alike and hence exclusive-OR gate 72 of FIG. 3 will be low. If the voltage is in region II, the outputs are different and gate 72 is high, which is an indication of a degraded eye. If this condition exists at the clock transition time as depicted in FIG. 4, the output of flip-flop 73 will change for one clock cycle and add one count to counter 74. If a certain number of such events is counted within a period of reset timer 75, a BER alarm is generated. This may typically by set for an error rate of $10^{-3}$ to $10^{-5}$ and can be set to indicate a true BER with considerable accuracy.

It should further be noted that while the BER monitor circuit described is intended for binary (two-level) eye patterns, very similar monitors can be constructed for multi-level eye patterns; the system is therefore applicable to efficient multi-lever digital systems.

The BER alarm responds to error conditions without regard to the cause, which is essential when degradiation due to an increase in interference is to be detected, as in the present invention.

Other means of extracting error rate information from the signal may be used. For instance, redundant levels may be added to the signal and used for error detection, as is the practice with partial response (also known as duo-binary and bi-ternary) systems. Additional bits may be added to the data stream for error detection by means known as pulse-stuffing. Any of these techniques (and others) may be used to obtain the required information about received signal quality, if care is taken to ensure adequate accuracy and speed of response.

What is claimed is:

1. In a digital radio transmission system, the method comprising the steps of transmitting a digital signal having a first signal level from a first location to a second remote location, monitoring at said second location a measure of the bit error rate of the received digital signal and changing the level of said transmitted digital signal when the received monitored bit error rate is different from a predetermined value, sampling at predetermined time intervals the demodulated digital signal and generating a second control signal when the sampled values of the received digital signal indicate a degradation of the received signal, determining whether second control signal occurs within a predetermined time period which is short compared to the average interval between data errors at said bit error rate, and generating said first control signal when said second control signal occurs within said predetermined time period.

2. A digital radio transmission system comprising means for transmitting a digital signal having a first signal level from a first location to a second remote location, means for monitoring at the second location a measure of the bit error rate of the received digital signal, and means for changing the level of said transmitted digital signal when the received monitored bit error rate is different from a predetermined value, said means for monitoring including means for sampling at predetermined time intervals the demodulated digital signal and generating second control signals when the sampled values of the received digital signal indicate a degradation of the received signal, and means for determining whether said second control signals occur within a predetermined time period which is short compared to the average interval between data errors at said bit error rate, and for generating said first control signal when a predetermined number of said second control signals occur within said predetermined time period.

3. A system as in claim 2 wherein said means for changing include means for increasing the level of said transmitted digital information signal from said first signal level when said received bit error rate is greater than a predetermined value.

4. A system as in claim 2 or 3 wherein said means for changing include means for decreasing the level of said transmitted digital signal from said first signal level when said received bit error rate is less than a predetermined value.

5. A digital radio transmission system comprising first transmitter means for transmitting from a first location a digital signal having a first signal level, first receiver means located at a remote second location for receiving and demodulating the digital signal, said first receiver means including means for monitoring a measure of the bit error rate of the received digital signal, and means for generating the first control signal when the bit error rate is different from a predetermined value, said first receiver means including second transmitter means for transmitting said second control signal to said first transmitter means, said first transmitter means including second receiver means for receiving said control signal and for changing the level of said transmitted digital signal when said received monitored bit error rate is different from said predetermined value, said means for monitoring including means for sampling at predetermined time intervals the demodulated digital signal and generating second control signals when the sampled values of the received digital signal indicate a degradation of the received signal, means for determining the number of said second control signals occurring within a predetermined time period which is short compared to the average interval between data errors at said bit error rate, and means for generating said first control signal when a predetermined number of said second control signals occur within said predetermined time period.

6. A system as in claim 5 wherein said means for monitoring includes means for sampling at predetermined time intervals the demodulated digital signal and generating second control signals when the sampled values of the received digital signal indicate a degradation of the received signal and counter means for counting the number of said second control signals occurring within a predetermined time and for generating said first control signal.

7. A digital radio transmission system comprising first and second transmitter means for transmitting from a first and a second remote location, respectively, digital radio signals having first and second signal levels, first and second receiver means located at said first and second locations, respectively, for receiving the transmitted digital signals, each of said receiver means including means for monitoring a measure of the bit error rate of the respective received digital signal and means for generating a control signal when the monitored bit error rate is different from a predetermined value, said first and second receiver means each including transmitter means for transmitting the respective control signal to said respective transmitter means, said respective transmitter means including receiver means responsive to the transmitted control signal and means for changing the level of the respective transmitted digital radio signal when said received monitored bit error rate is different from said predetermined value, said means for monitoring including means for sampling at predetermined time intervals the demodulated digital signal and generating second control signals when the sampled values of the received digital signal indicate a degradation of the received signal, means for counting the number of said second control signals occurring within a predetermined time period which is short compared to the average interval between data errors at said bit error rate, and means for generating said first control signal when a predetermined number of said second control signals occur within said predetermined time period.

8. A digital radio transmission system for transmitting digital radio signals between first and second remote locations, said system comprising means for transmitting a digital ratio signal having a first signal level between said first location and said second remote location, means for monitoring at the receiving location a measure of the bit error rate of the received digital signal and means for changing the level of the transmitted digital signal when the received monitored bit error rate is different from a predetermined value, said means for monitoring including means for sampling at predetermined time intervals the demodulated digital signal and generating second control signals when the sampled values of the received digital signal indicate a degradation of the received signal, counter means for counting the number of said second control signals occurring within a predetermined time period which is short compared to the average interval between data errors at said bit error rate, and means for generating said first control signal when a predetermined number of said second control signals occur within said predetermined time period.

* * * * *